United States Patent [19]
Meyers

[11] 3,777,518
[45] Dec. 11, 1973

[54] APPARATUS FOR LOCKING GEAR SHIFT STICK AND HANDBRAKE LEVER OF A MOTOR VEHICLE

[75] Inventor: Calvin E. Meyers, Freeport, N.Y.
[73] Assignee: Bug-Lok Corporation, Freeport, N.Y.
[22] Filed: Mar. 23, 1972
[21] Appl. No.: 237,320

[52] U.S. Cl. .................................. 70/200, 70/238
[51] Int. Cl. ...................... E05b 65/12, G05g 5/10
[58] Field of Search .................... 70/198, 199, 200, 70/238, 239, 247, 254

[56] References Cited
UNITED STATES PATENTS
1,288,569  12/1918  Hallock .............................. 70/200
FOREIGN PATENTS OR APPLICATIONS
804,404   4/1951  Germany ............................ 70/212
1,223,123  2/1971  Great Britain ..................... 70/238

*Primary Examiner*—Marvin A. Champion
*Assistant Examiner*—Richard P. Tremblay
*Attorney*—Granville M. Brumbaugh et al.

[57] ABSTRACT

The apparatus for locking the handbrake lever and gear shift stick of a motor vehicle is a two-ended body having means adjacent a first end adapted to securely hold a portion of the gear shift stick in a desired position and means adjacent its second end adapted to be locked to a portion of the handbrake lever when the second end of the body is fitted over the handbrake. The means adjacent the first end of the body comprises a slot cut through the surface of the body extending around about one-half of the periphery of the body and merging at right angles at each of its ends with a straight slot which extends towards but terminates some distance from the first end of the body. The means adjacent the second end of the body comprises two slots cut through the surface of the body which each extend around slightly less than one-half the periphery of the body and which are adapted to receive a shackle of a padlock assembly. The shackle has a thickened portion which forms a restriction in an open bore in the body adjacent the second end and thereby prevents removal of the body from the handbrake lever when the padlock assembly is locked.

6 Claims, 6 Drawing Figures

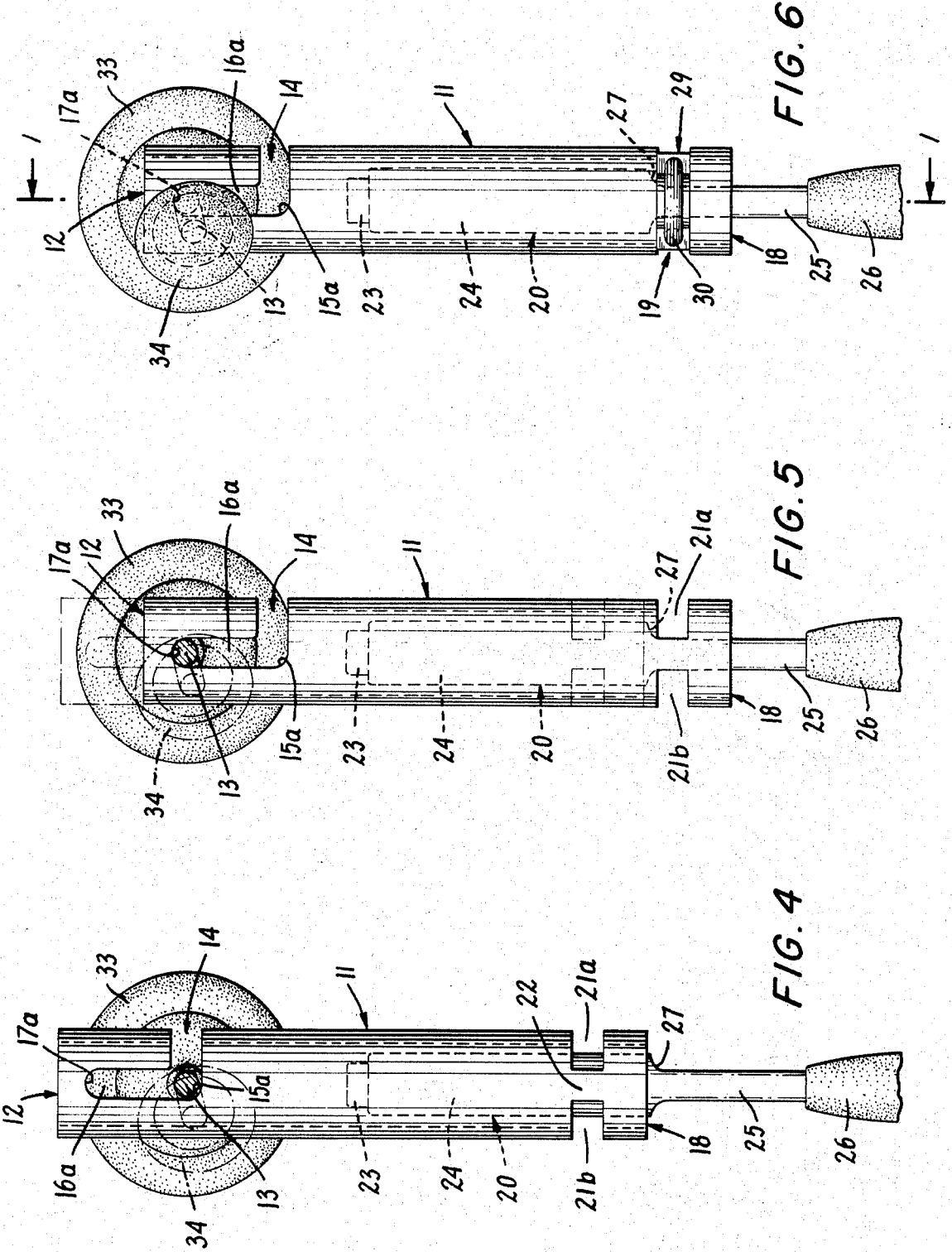

APPARATUS FOR LOCKING GEAR SHIFT STICK AND HANDBRAKE LEVER OF A MOTOR VEHICLE

The present invention is an apparatus to lock the handbrake lever and gear shift stick of a motor vehicle so that the vehicle cannot be moved.

Examples of other various locking mechanisms for motor vehicles are described in a number of U.S. patents. Representative examples include those described in U.S. Pat. Nos. 1,142,845, 1,211,217, 1,349,973 and 1,440,823. The present invention is intended for use as an accessory item and enables the operator of the vehicle to lock the handbrake lever and gear shift stick by use of simple and dependable equipment. The device is especially designed for use in cars having a vertically oriented gear shift stick which is situated on the floor of the motor vehicle and a straight handbrake lever which points towards the gear shift stick and which is locked by raising the lever. An example of one motor vehicle having such a gear shift lever-handbrake lever arrangement is the standard Volkswagen. Examples of other motor vehicles which can use the apparatus of the present invention will occur to persons familiar with the automotive field.

The apparatus of the present invention is a two-ended body having means adjacent the first end which are adapted to hold a portion of the gear shift stick and means adjacent a second end which are adapted to be locked to a portion of the handbrake lever.

The means at the first end comprise a slot cut through the surface of the body which extends around one-half the periphery of the body and has each of its two ends merging with a straight slot also cut through the surface of the body on the opposite side of the body from the other straight slot. Each of the straight slots extends towards but terminates at some distance from the first end of the body. The gear shift stick is maneuvered into the slots, as will be described in greater detail below, so that it is securely seated at the ends of the straight slots.

The second end of the body has means adjacent to it which comprise two slots on opposite sides of the body from one another which are cut in the surface of the body and communicate with an open bore within the body. Each slot extends around slightly less than one-half the periphery of the body. A shackle of a padlock assembly having a thickened portion thereon can be threaded through the slots once they have been placed adjacent a reduced diameter portion of the handbrake when the latter is in its raised or locked position. When the shackle is locked using a conventional lock body, the thickened portion of the shackle forms a restriction in the bore inside the body and prevents movement of the body from its position on the handbrake. The second end of the body is therefore securely held to the portion of the handbrake against movement.

The locking of the body to a portion of the locked handbrake lever and the secure seating of the gear shift stick, preferably when the stick is in reverse gear, prevents theft of the car.

The attached drawings which also form a part of the specification illustrate the invention in greater detail:

FIG. 4 is an overhead view showing an initial step in the positioning of the body of the present invention to hold the gear shift stick and handbrake lever;

FIG. 5 is a view similar to that in FIG. 4 showing the position of the body of the present invention just prior to application of the padlock assembly; and FIG. 6 is a view similar to that in FIGS. 4 and 5 showing the final position of the apparatus when it holds the gear shift stick and is locked to the handbrake lever of the motor vehicle.

Figure 1:
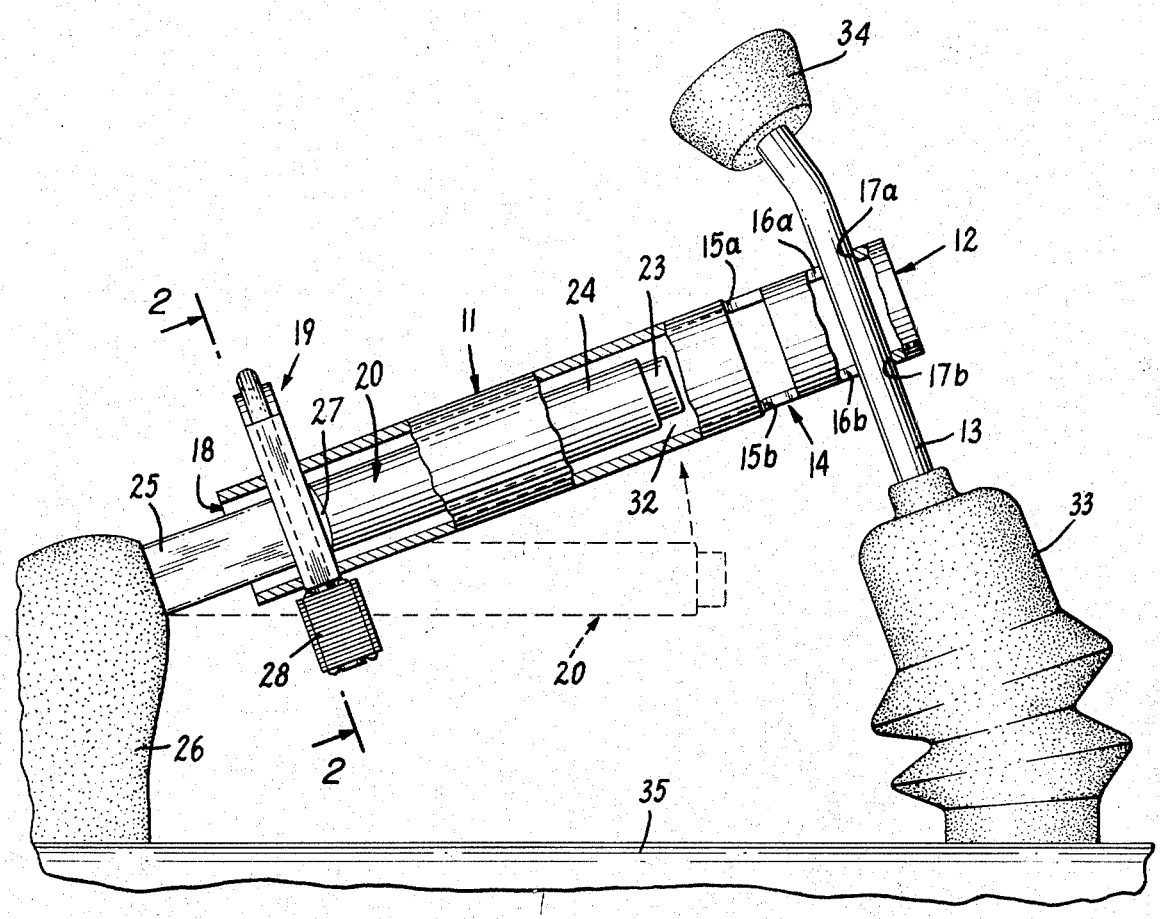
FIG. 1 is a view partially in section from the side showing in solid lines the apparatus of the present invention locked to the raised handbrake lever and holding the gear shift stick and shows in dotted lines the handbrake lever in its unlocked position.
Figure 2:
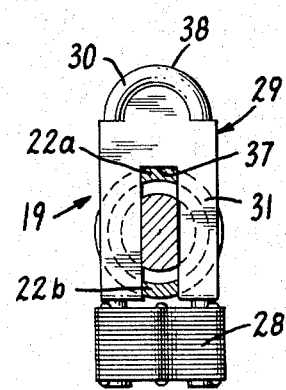
FIG. 2 is a view taken along line 2—2 of FIG. 1 looking in the direction of the arrows showing the construction of the padlock assembly in greater detail when it is applied to lock one end of the apparatus to a handbrake lever.

As is best seen in FIGS. 1 and 6 the apparatus of the present invention comprises a body 11, preferably cylindrical in form, which in a preferred embodiment has an open bore 32 therethrough. The body is formed of a hard impact-resistant material such as heavy duty steel. It has means adjacent its first end 12 for holding a portion of the gear shift stick 13 which is connected to the transmission (not shown) below the floor 35 of a motor vehicle. The stick 13 has a protective rubber boot 33 at its lower end and a knob 34 which is grasped by the operator at its upper end.

The means for holding the stick 13 comprise a slot 14 which, as best seen in FIG. 1, is cut through the surface of the body 11 and preferably communicates with an open bore 32 in the body 11. The slot 14 extends around one-half the periphery of the body so that each of its ends 15a and 15b are on opposite sides of the body 11 from one another. Both ends 15a and 15b of slot 14 each merge with slots 16a and 16b, respectively, which are also preferably situated on opposite sides of the body 11 from one another. These slots 16a and 16b both extend towards but terminate some distance from the end 12 of body 11. The termination points 17a and 17b of the slots 16a and 16b are each adapted to seat and hold a portion of gear shift lever 13.

The other end 18 of body 11 has means lying adjacent to it for locking a portion of body 11 to the handbrake lever 20. These means comprise two slots 21a and 21b lying on opposite sides of body 11 from one another which are cut through the surface of body 11 to communicate with an open bore 32 lying within body 11. The slots 21a and 21b each extend around slightly less than one-half the periphery of body 11 leaving only two very small portions 22a and 22b in the top and bottom surfaces of body 11, respectively. The slots 21a and 21b are adapted to hold a padlock assembly which locks the second end 18 of body 11 to a portion of the handbrake lever 20 once that lever has been placed in the raised, locked position.

The apparatus of the present invention is quite simple in its operation. A person using a car having the type of vertically oriented gear shift stick and handbrake lever described above will first stop the car and will place the transmission in whatever gear desired, preferably in reverse gear. As shown schematically in FIG. 3 the transmission can be placed into reverse gear after the ignition is turned off by pressing down on the knob 34 on top of the gear shift stick 13 when the clutch (not shown) is depressed and immediately thereafter moving the stick 13 to the left and then rearwardly. Either before or after the act of shifting into reverse gear, but preferably before, the handbrake 20 is raised from its unlocked position shown in dotted line in FIG. 1 to the raised, locked position shown in solid lines in FIG. 1.

When the car is in reverse gear and the handbrake lever 20 is in its raised position, the person slides the end 18 of body 11 over the release button 23 at the end of the enlarged handgrip 24 of brake lever 20 and over a major portion of the enlarged portion 24 of handbrake lever 20 while also maneuvering slot 14 to a position next to gear shift stick 13. Due to the position of the stick 13 and lever 20 the axis of the body will be at a slight angle to a line running between stick 13 and lever 20 when this operation is performed. When the body 11 has been moved into this position a sideward movement of the first end of the body 11 towards gear shift stick 13 will bring the stick into slot 14 so that it can be moved to the ends 15a and 15b of slot 14 which also form the junction of slots 16a and 16b with slot 14. This will result in orientation of the apparatus which is similar to the view depicted in FIG. 4.

Further rearward movement of the apparatus towards the protective boot 26 at the rear of handbrake lever 20 will bring the end 18 of apparatus 11 into a position over brake lever 20 so that the slots 21a and 21b will be over the reduced portion 25 of the handbrake and will lie adjacent the juncture 27 of the reduced portion 25 and the more forwardly positioned enlarged portion 24 of brake lever 20. At the same time this rearward movement of the body 11 will bring the gear shift stick 13 into secure contact with ends 17a and 17b of slots 16a and 16b, respectively.

Figure 3:
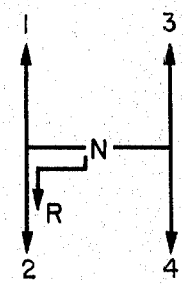
FIG. 3 is a schematic diagram showing in an overhead view how the gear shift stick is moved into various forward speeds and reverse in a motor vehicle which can use the present invention.

When the body 11 is brought into this position the gear shift stick 13 is held securely against the termination points 17a and 17b of slots 16a and 16b and cannot be moved forward. Such forward movement would be needed to bring the transmission back into neutral gear as is shown by FIG. 3. When the body 11 is in this position it is securely locked against forward movement by use of padlock assembly 19.

The padlock assembly 19 which is used to securely lock the body 11 against forward or rearward movement relative to the gear shift stick 13 and handbrake lever 20 comprises a conventional lock body 28 and a special shackle 29, the latter having a normal thin shackle 30 in combination with a thickened portion 31 which is adapted to lie at least partially within slots 21a and 21b to form a restricted opening in open bore 32 of body 11. The positioning of the restriction at the juncture 27 of the enlarged portion 24 and reduced portion 25 of handbrake 20 prevents forward movement of body 11. The lowermost surface 37 of thickened portion 31 underneath the curved apex 38 of this shackle 30 is securely seated upon an uncut portion 22a in the surface of body 11.

When the device is locked securely in place as shown in FIGS. 1 and 6 a person trying to move the motor vehicle will be unable to move the transmission out of reverse gear and will also be unable to release the hand brake lever. This will largely preclude theft of the vehicle.

Upon reading the foregoing specification and examining the appended drawings a person of ordinary skill in the art will undoubtedly be aware of modifications that can be made to the above-described apparatus. Hence, the foregoing is intended to be merely illustrative of the invention and is not intended to be limiting. The scope of protection is given in the appended claims.

I claim:

1. An apparatus for locking the handbrake lever and gear shift stick of a motor vehicle comprising a two-ended body having at a first end means which are adapted to hold a portion of the gear shift stick, said means comprising a first slot cut through the surface of the body and extending around one-half the periphery of the body, said first slot merging with two other slots also cut through the surface of the body, each of the two other slots being on the opposite side of the body from one another, and each extending towards but terminating a distance from the first end of the body, said body also having means adjacent its second end which are adapted to be locked to a portion of the handbrake lever when the second end of the body is fitted over a portion of the handbrake lever.

2. An apparatus as claimed in claim 1 wherein the merger of the other slots and the first slot adjacent the first end of the body is at right angles.

3. An apparatus as claimed in claim 1 wherein the two other slots are rounded at their respective termination points.

4. An apparatus for locking the handbrake lever and gear shift stick of a motor vehicle comprising a two-ended body having adjacent the first end means which are adapted to hold a portion of the gear shift stick and having adjacent the second end means which are adapted to be locked to a portion of the handbrake lever when the second end of the body is fitted over a portion of the handbrake lever, said means adjacent the second end of the body comprising two slots cut through the surface of the body to communicate with an open bore in the body, the two slots lying on opposite sides of the body from one another and each extending around nearly one-half the periphery of the body, and a padlock assembly having a shackle with a thickened portion thereon, the shackle being adapted to lie at least partially within the two slots so that when the padlock assembly is locked the thickened portion of the shackle forms a restriction in the open bore inside the body adjacent the slots.

5. An apparatus for locking the handbrake lever and gear shift stick of a motor vehicle comprising a two-ended body having means adjacent a first end which are adapted to hold a portion of the gear shift stick, said means comprising a first slot cut through the surface of the body and extending around one-half the periphery of the body, said first slot merging with two other slots also cut through the surface of the body, each of the other slots being on opposite sides of the body from one another, and each extending towards but terminating a distance from the first end of the body, said body also having means adjacent its second end which are adapted to be locked to a portion of the handbrake lever when the second end of the body is fitted over a portion of the handbrake lever, said means adjacent the second end comprising two slots cut through the surface of the body to communicate with an open bore in the body, the two slots lying on opposite sides of the body from one another, each slot extending around nearly one-half the periphery of the body and a padlock assembly having a shackle with a thickened portion thereon, the shackle being adapted to lie at least partially within the two slots so that when the padlock assembly is locked the thickened portion of the shackle forms a restriction in the open bore inside the body adjacent the slots.

6. An apparatus as claimed in claim 5 wherein the merger of the first slot and the two other slots adjacent the first end of the body is at right angles.

* * * * *